US008641787B2

(12) United States Patent
Morgan

(10) Patent No.: US 8,641,787 B2
(45) Date of Patent: *Feb. 4, 2014

(54) PRODUCTION OF RENEWABLE DIESEL BY PYROLYSIS AND ESTERIFICATION

(75) Inventor: William Douglas Morgan, Richmond, CA (US)

(73) Assignee: Endicott Biofuels II, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/333,051

(22) Filed: Dec. 21, 2011

(65) Prior Publication Data

US 2012/0085022 A1   Apr. 12, 2012

Related U.S. Application Data

(63) Continuation of application No. 12/172,875, filed on Jul. 14, 2008, now Pat. No. 8,105,399.

(60) Provisional application No. 60/962,691, filed on Jul. 31, 2007.

(51) Int. Cl.
*C10L 1/19* (2006.01)

(52) U.S. Cl.
USPC ................... 44/308; 44/388; 585/240

(58) Field of Classification Search
USPC .............. 44/308, 301; 554/164; 585/361, 240
See application file for complete search history.

(56) References Cited

U.S. PATENT DOCUMENTS

| | | | |
|---|---|---|---|
| 2,320,844 A | 6/1943 | Black | |
| 2,486,630 A | 11/1949 | Brown | |
| 3,707,361 A | 12/1972 | Annable | |
| 4,193,770 A | 3/1980 | Chase et al. | |
| 4,698,186 A | 10/1987 | Jeromin et al. | |
| 5,308,365 A | 5/1994 | Kesling, Jr. et al. | |
| 5,399,731 A | 3/1995 | Wimmer | |
| 5,536,856 A * | 7/1996 | Harrison et al. | 554/164 |
| 5,578,090 A | 11/1996 | Bradin | |
| 6,045,762 A | 4/2000 | Chuang et al. | |
| 6,174,501 B1 | 1/2001 | Noureddini | |
| 6,299,655 B1 | 10/2001 | Steckel et al. | |
| 6,399,801 B1 | 6/2002 | Smith et al. | |

(Continued)

FOREIGN PATENT DOCUMENTS

JP    06-313188    11/1994
WO    WO 90/08127   7/1990

(Continued)

OTHER PUBLICATIONS

He, B.B., et al., Experimental Optimization of a continuous-flow reactive distillation rector for biodiesel production, 2005, American Society of Agriculture Engineers, vol. 48, issue 6, pp. 2243.

(Continued)

*Primary Examiner* — Prem C Singh
*Assistant Examiner* — Chantel Graham
(74) *Attorney, Agent, or Firm* — King & Spalding LLP

(57) ABSTRACT

The present invention relates to a process and apparatus for the production of diesel fuel from feedstocks containing fatty acids, glycerated fatty acids, and glycerin by catalytic and/or non-catalytic pyrolysis followed by esterification. Specifically, the present invention relates to the production of Renewable Diesel having low glycerin, water, and sulfur content.

7 Claims, 2 Drawing Sheets

(56) References Cited

U.S. PATENT DOCUMENTS

| | | |
|---|---|---|
| 6,630,430 B1 | 10/2003 | Anantaneni et al. |
| 6,855,838 B2 | 2/2005 | Haas et al. |
| 6,965,044 B1 | 11/2005 | Hammond et al. |
| 7,045,100 B2 | 5/2006 | Ergun et al. |
| 7,091,367 B2 | 8/2006 | Moritz et al. |
| 7,635,398 B2 | 12/2009 | Bertram et al. |
| 7,705,170 B2 | 4/2010 | Geier et al. |
| 2002/0184814 A1 | 12/2002 | Manka |
| 2004/0060226 A1 | 4/2004 | Bongart et al. |
| 2004/0106813 A1 | 6/2004 | Moritz et al. |
| 2004/0254387 A1 | 12/2004 | Luxem et al. |
| 2005/0039384 A1 | 2/2005 | Gormley |
| 2005/0081436 A1 | 4/2005 | Bertram et al. |
| 2005/0261144 A1 | 11/2005 | Notari et al. |
| 2006/0016751 A1 | 1/2006 | Ali et al. |
| 2006/0048443 A1* | 3/2006 | Filippini et al. ............... 44/301 |
| 2006/0246563 A1 | 11/2006 | Eroma et al. |
| 2006/0264681 A1 | 11/2006 | Obenaus et al. |
| 2006/0293533 A1 | 12/2006 | Iyer |
| 2007/0033865 A1 | 2/2007 | Caprotti et al. |
| 2007/0049727 A1 | 3/2007 | Pollock et al. |
| 2007/0124992 A1 | 6/2007 | Reaney et al. |
| 2007/0129565 A1 | 6/2007 | Sutton et al. |
| 2007/0130820 A1 | 6/2007 | Chatterjee et al. |
| 2007/0137097 A1* | 6/2007 | Ikura ............................. 44/308 |
| 2007/0142652 A1 | 6/2007 | Arumughan et al. |
| 2007/0158270 A1 | 7/2007 | Geier et al. |
| 2007/0238905 A1 | 10/2007 | Arredondo et al. |
| 2007/0260077 A1 | 11/2007 | Elliott |
| 2007/0277429 A1 | 12/2007 | Jackam et al. |
| 2007/0277432 A1 | 12/2007 | Jackam et al. |
| 2008/0051592 A1 | 2/2008 | McNeff et al. |
| 2008/0051599 A1 | 2/2008 | Adami et al. |
| 2008/0071125 A1* | 3/2008 | Li ................................. 585/361 |
| 2009/0188157 A1* | 7/2009 | Holloway et al. ............. 44/301 |
| 2010/0047884 A1 | 2/2010 | De Greyt et al. |
| 2010/0136113 A1 | 6/2010 | Steer et al. |
| 2012/0285077 A1 | 11/2012 | Oyler |

FOREIGN PATENT DOCUMENTS

| | | |
|---|---|---|
| WO | WO 95/25152 | 9/1995 |
| WO | WO 2004/080942 | 9/2004 |
| WO | WO 2006/093896 | 9/2006 |
| WO | WO 2007/050030 | 5/2007 |

OTHER PUBLICATIONS

26 U.S.C. § 40A. Jan. 3, 2006. Downloaded on Sept, 30, 2008 from <<http://uscode.house.gov/uscode-cgi/fastweb. exe?getdoc+uscview+usclass+2465+0++%28%29%20%20>>.

Chongkhong S. et al., "Biodiesel production by esterification of palm fatty acid distillate," Biomass and Bioenergy, vol. 31, issue 8, pp. 563-568, Aug. 2007, available online May 7, 2007.

Dasari, M. A., "Catalytic Conversion of Glycerol and Sugar Alcohols to Value-Added Products." PhD Thesis. University of Missouri-Columbia. May 2006. Downloaded from <<edt.missouri/Winter2006/Dissertation/DasariM-051506-D4163/research.pdf>>.

Environmental Protection Agency, "Regulation of Fuels and Fuel Additives: Renewable Fuel Standard Program: 40 CFR Part 80" Federal Register, vol. 72, No. 83, pp. 23900-24014, May 1, 2007.

Lotero et al., "The Catalysis of Biodiesel Synthesis," Catalysis, vol. 19, pp. 41-83, 2006.

Ma et al., "Biodiesel Production: a review" Bioresource Technology, vol. 70, pp. 1-15, Oct. 1999.

Japan Takahiro, K. et al., Application No. H6-313188, Nov. 8, 1994, English translation 8 pages.

Japan Takahiro, K. et al., Application No. H6-313188, Nov. 8, 1994, English translation of document 4 pages.

* cited by examiner

PRODUCTION OF RENEWABLE DIESEL BY PYROLYSIS AND ESTERIFICATION

CROSS-REFERENCE TO RELATED APPLICATIONS

This application is a continuation application of and claims priority under 35 U.S.C. §120 to U.S. patent application Ser. No. 12/172,875, titled "Production Of Renewable Diesel By Pyrolysis And Esterification," filed Jul. 14, 2008, which claims the benefit of priority to U.S. Provisional Patent Application 60/962,691, filed Jul. 31, 2007. The contents of each of the applications are incorporated by reference in their entirety.

FIELD OF THE INVENTION

The present invention relates to a process and apparatus for the production of diesel fuel from feedstocks containing fatty acids, glycerated fatty acids, and glycerin by catalytic and/or non-catalytic pyrolysis followed by esterification. Specifically, the present invention relates to the production of Renewable Diesel having low glycerin, water and sulfur content.

BACKGROUND

Diesel fuel is a refined petroleum product which is burned in the engines powering many of the world's trains, ships, and large trucks. Petroleum is a non-renewable resource of finite supply. Acute shortages and dramatic price increases in petroleum and the refined products derived from petroleum have been suffered by industrialized countries during the past quarter-century. Furthermore, diesel engines which run on petroleum based diesel emit relatively high levels of certain pollutants, especially particulates. Accordingly, extensive research effort is now being directed toward replacing some or all petroleum-based diesel fuel with a cleaner-burning fuel derived from a renewable source such as farm crops, waste animal fats, and other suitable waste materials.

In an effort to partially replace dependence on petroleum based diesel, vegetable oils have been directly added to diesel fuel. These vegetable oils are composed mainly of triglycerides, and often contain small amounts (typically between 1 and 10% by weight) of free fatty acids. Some vegetable oils may also contain small amounts (typically less than a few percent by weight) of mono- and di-glycerides.

Triglycerides are esters of glycerol, $CH_2(OH)CH(OH)CH_2(OH)$, and three fatty acids. Fatty acids are, in turn, aliphatic compounds containing 4 to 24 carbon atoms and having a terminal carboxyl group. Diglycerides are esters of glycerol and two fatty acids, and monoglycerides are esters of glycerol and one fatty acid. Naturally occurring fatty acids, with only minor exceptions, have an even number of carbon atoms and, if any unsaturation is present, the first double bond is generally located between the ninth and tenth carbon atoms. The characteristics of the triglyceride are influenced by the nature of their fatty acid residues.

The production of alkyl esters of glycerides by transesterification is a known process. However, transesterification suffers in that the reaction generally requires the addition of an acid or base catalyst which must be neutralized after the reaction thereby generating salts and soaps. In addition, while transesterification results in the separation of fatty acid esters from triglycerides, it also results in the production of glycerin, which must then be separated from the fatty acid esters, glycerin, excess alcohol, salts, and soaps.

The production of alkyl esters of fatty acids by acid catalyzed esterification is also known. However, the use a strong acid, such as sulfuric acid, typically leads to higher sulfur content in the resulting ester as the acid reacts with the double bonds in the fatty acid chains. In addition, conversion of the esterification reaction is limited by equilibrium constraints such that either excessive time and equipment size are required or less conversion needs to be accepted.

In an effort to overcome some of the problems associated with transesterification, several attempts have been made to employ esterification between fatty acids and alcohols. In these processes, fatty acids are prepared from triglycerides by hydrolysis, followed by catalyzed esterification of the fatty acids with an alcohol, preferably methanol. While this practice is practiced in the production of fatty alcohols and fatty acid esters, as described in U.S. Pat. No. 5,536,856 (Harrison et al), it has not been practiced in the production of Renewable Diesel.

SUMMARY

In the present invention, methods of obtaining a renewable diesel product that meets either or both ASTM D396 or ASTM D975 specifications from oils of vegetable and animal origin while eliminating the shortcomings of transesterification, wet chemical esterification, and/or hydrolysis are disclosed. Under US tax law, products derived from animal or vegetable origin that meet ASTM D396 or ASTM D975 specification can be considered to be "Renewable Diesel" for tax purposes. According to the invention, Renewable Diesel as used herein is produced where pyrolysis is advantageously substituted for hydrolysis in order to lower the capital cost from that associated with hydrolysis. In one embodiment, in order to further upgrade products by eliminating any remaining acidity while avoiding reaction equilibrium limitations and sulfur contamination normally associated with esterification, reactive distillation over solid catalysts is performed.

In one aspect, the current invention utilizes catalytic and/or non-catalytic pyrolysis to produce a product that meets either ASTM D396 or ASTM D975 specifications or both. Pyrolysis can be performed in a number of ways that are familiar to those skilled in the art. In general, pyrolysis accomplishes the need to liberate glycerin as a free material or as a derivative of itself such as propane. Pyrolysis also results in conversion of de-glycerated fatty acids into normal, branched, and cyclic alkanes, alkenes, and oxygenates. Because some of the oxygenates produced by pyrolysis may be of the carboxylic acid type, the resulting material may still be too acidic to pass ASTM D975 specifications for copper strip corrosion. Materials that pass ASTM D975 specifications tend to be higher in value than those that do not pass ASTM D975 but still pass ASTM D396. Examples include No. 4 and No. 6 fuel oils. While materials that pass either ASTM D975 or D396 are considered Renewable Diesel under US Tax law, it may also be advantageous to be able to produce a material that has very low acidity such that it can be sold into markets for No. 1 and No. 2 fuel oils, i.e. diesel. Accordingly, in order to reduce acidity in one aspect of the invention, the present invention subjects the pyrolysis product to reactive distillation-based esterification with an alcohol such that the carboxylic acids in the product are converted to esters.

In one embodiment, the present invention provides a continuous process for the production of US Tax Code-defined Renewable Diesel fuel low in glycerin, sulfur, and water from oil feedstocks of animal and vegetable origin. More particularly, the present invention provides a process wherein pyrolysis is used to produce a stream of liquid hydrocarbons that may or may not contain carboxylic acids. In order to upgrade the liquid hydrocarbons, any carboxylic acids therein may be further reacted with alcohols by reactive distillation over heterogeneous ion exchange resin catalysts to produce a neutral product.

According to one aspect of the present invention, there is provided a continuous process for the production of mainly glycerin- and glyceride-free hydrocarbons and oxygenated hydrocarbons by pyrolysis of oils of vegetable and/or animal origin. These feedstocks will consist of fatty acids, glycerated fatty acids, and/or other hydrocarbons or mixtures thereof.

In one embodiment of the invention, pyrolysis is accomplished in the tubes of a direct fired furnace upstream of a distillation column. The products formed in the furnace tubes are then separated in the distillation column to produce a liquid product that boils in the range permitted by ASTM D396 or D975 and a vapor product that is utilized for other purposes. In another embodiment of the invention, for at least part of their length, the furnace tubes contain a solid catalyst known to improve pyrolysis conversion and selectivity to non-oxygenated hydrocarbons. In another embodiment of the art, a heat exchanger is used in place of a direct fired furnace. In another embodiment, direct fired or indirect heated batch distillation is used in place of both the furnace or heat exchanger and the separate distillation column. In another embodiment, pyrolysis is conducted in the presence of water and/or steam.

According to the present invention, higher value products can be produced by further converting the carboxylic acids present in the pyrolysis product to alcohol esters by reactive distillation. In such reactive distillation, the acid components in the pyrolysis product and an alcohol component are passed in countercurrent relation in a column in which an esterification zone is maintained under esterification conditions that include the presence of a solid esterification catalyst. In certain embodiments, the esterification catalyst may be selected from particulate ion exchange resins having sulfonic acid groups, carboxylic acid groups or both. The process is characterized in that the esterification zone includes a column reactor provided with a plurality of esterification trays mounted one above another, each adapted to hold a predetermined liquid volume and a charge of solid esterification catalyst. The less volatile component of the fatty acid component and of the alcohol component is supplied in liquid phase to the uppermost section of the reaction column and the more volatile component is supplied as a vapor to a lower portion of the reaction column. Vapor comprising the more volatile component and water from the esterification can be recovered from an upper part of the column reactor, and Renewable Diesel can be recovered from a lower part of the column reactor.

In another embodiment, a process for the preparation of Renewable Diesel from a fatty acid feedstock is provided. A methanol vapor feedstream and a fatty acid feedstream are continuously introduced to a reaction vessel. The methanol and fatty acid are catalytically reacted in a reaction zone in the presence of a heterogeneous esterification catalyst within the reaction vessel to produce fatty acid methyl esters and water. The water is removed from the reaction zone with the methanol vapor and is separated from the alcohol, and Renewable Diesel is collected as product.

In another embodiment, a process for preparing Renewable Diesel from an animal- or vegetable-derived oil, wherein the fuel has a low glycerin and sulfur content is provided. The feedstock is first subjected to batch or continuous pyrolysis to produce a stream consisting of hydrocarbons and oxygenated hydrocarbons. This product is either used directly as Renewable Diesel Fuel or further fed to a reactive distillation column in order to esterify the remaining acids to esters. In this reactive distillation column, an alcohol vapor feedstream is introduced to the countercurrently to the pyrolysis product fed to it. The pyrolysis product and alcohol feedstream catalytically react in a reaction zone having a heterogeneous catalyst to produce Renewable Diesel and water. Water is stripped from the reaction vessel by the alcohol vapor, separated from the alcohol and the alcohol is recycled to the reaction vessel. In one embodiment, the catalytic zone includes an ion exchange resin catalyst comprising —$SO_3H$ or —$CO_2H$ functional groups.

In another embodiment, a Renewable Diesel fuel product having a water content less than 0.050% by volume is prepared. In another embodiment, the Renewable Diesel fuel has a kinematic viscosity is between 1.3 and 50 $mm^2/s$. In another embodiment, the Renewable Diesel fuel has a sulfur content that is less than 500 ppm, preferably less than 15 ppm. In another embodiment, the free glycerin content of the Renewable Diesel fuel is less than 0.020% by weight. In another embodiment, the total glycerin content of the Renewable Diesel is less than 0.240% by weight. In another embodiment, the Renewable Diesel is produced on an industrial scale.

DETAILED DESCRIPTION

Figure 1:
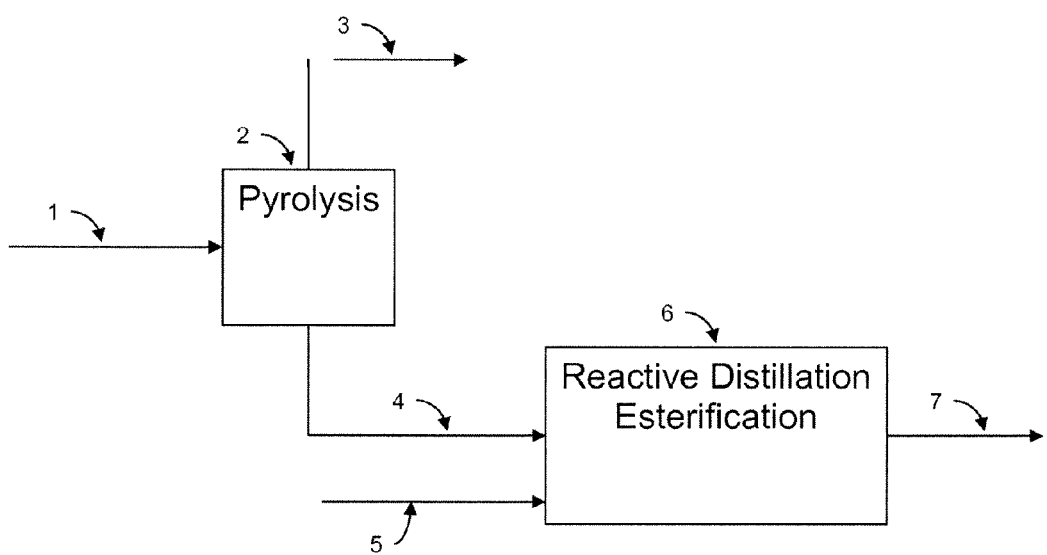
FIG. 1 shows one embodiment of the present reaction for the preparation of low acidity Renewable Diesel by pyrolysis followed by reactive distillation esterification.

The present invention provides a process for the production of Renewable Diesel fuels having low acidity, low glycerin, and low sulfur content, from oils of animal and vegetable origin.

Renewable Diesel as defined by US tax law is a material derived from animal or vegetable origin which meets ASTM D396 and/or ASTM D975 specifications. The process of the present invention employs a combination of pyrolysis and, if desired, reactive distillation esterification to produce fuels that meet either or both of these standards and therefore qualify as Renewable Diesel for US Tax purposes.

Pyrolysis refers to the process of thermally decomposing a material in the presence or absence of a catalyst and/or steam. According to the present invention, pyrolysis refers to thermally decomposing, in the presence or absence of a catalyst or steam, the fatty acids, glycerides, and other hydrocarbons found in animal and vegetable oils to normal, branched, and/or cyclic alkanes, alkenes, and oxygenated hydrocarbons that may by themselves meet ASTM D396 and/or ASTM D975 specifications. Pyrolysis may be accomplished in any number of fashions. In one embodiment of the invention, pyrolysis is accomplished in the tubes of a direct-fired furnace upstream of a distillation column. The products formed in the furnace tubes are then separated in the distillation column to produce a liquid product that boils in the range permitted by ASTM D396 or D975 and a vapor product that is utilized for other purposes.

Reactive Distillation Esterification refers to a process taking place in a column so designed such that the vapor stream of the more volatile of the two components, (i.e. the more volatile of the pyrolysis product component and the alcohol component), flows countercurrent to the less volatile component such that the vapor stream carries away water produced in the esterification reaction, while advantageously not carrying away a significant quantity of the less volatile component. For this reason it is essential that the boiling point of the vapor mixture exiting the esterification reactor, or of the highest boiling compound present in that vapor mixture, be significantly lower, at the pressure prevailing in the uppermost stage of the esterification reactor, than the boiling point at that pressure of either of the less volatile one of the two components. By the phrase "significantly lower" is meant that the boiling point difference shall be at least about 20° C., and preferably at least about 25° C., at the relevant operating pressure of the column. In practice, the more volatile component of the two will frequently be the alcohol component. For example, methanol will be the more volatile component in the production from fatty acid mixtures obtained by the hydrolysis of triglycerides of methyl fatty acid ester mixtures for subsequent processing, for example for production of detergent alcohols by ester hydrogenation.

The animal or vegetable oil feedstocks for use according to the invention include, but are not limited to, fatty acids such as decanoic acid, dodecanoic acid, tetradecanoic acid, hexadecanoic, acid, octadecanoic acid, octadecenoic acid, linoleic acid, eicosanoic acid, isostearic acid and the like, as well as mixtures of two or more thereof as well as oils described as coconut oil, rape seed oil, and palm oils, tall oils, lard, bacon grease, yellow grease, tallow and fish oils. Additional oils may be sourced from whale oil and poultry fat, as well as corn, palm kernel, soybean, olive, sesame, and any other oils of animal or vegetal origin not explicitly identified herein. If desired, such mixtures of acids can be subjected to distillation to remove lower boiling acids having a lower boiling point than a chosen temperature (e.g. $C_8$ to $C_{10}$ acids) and thus produce a "topped" mixture of acids. Optionally, the mixtures can be distilled to remove higher boiling acids having a boiling point higher than a second chosen temperature (e.g. $C_{22}+$ acids) and thus produce a "tailed" mixture of acids. Additionally, both lower and higher boiling acids may be removed and thus produce a "topped and tailed" mixture of acids. Such fatty acid mixtures may also contain ethylenically unsaturated acids such as oleic acid. Such mixtures may also contain fatty acid esters.

In another aspect of the present invention, Renewable Diesel fuels prepared according to the present invention are provided. Sulfur content of the Renewable Diesel fuel is one of many parameters of interest for commercial use. Sulfur is typically present as a result of the use of sulfuric acid catalysts, and can result in increased engine wear and deposits. Additionally, environmental concerns dictate a desired low sulfur content in the Renewable Diesel fuel. Preferably, Renewable Diesels prepared according the methods provided herein have a sulfur content (as measured by ASTM test method D5453) of less than 500 ppm, more preferably less than 200 ppm, less than 100 ppm, less than 50 ppm, less than 25 ppm, less than 10 ppm, and most preferably less than 5 ppm.

The cetane number (i.e., the measure of the ignition quality of the fuel, as measured by ASTM test methods D976 or D4737) is preferably greater than 47, more preferably greater than 50, and most preferably greater than 55.

Cloud points are defined as the temperature at which a cloud or haze of crystals appears in the fuel. Cloud points determine the climate and season in which the Renewable Diesel fuel may be used. Preferably the cloud point of the Renewable Diesel is less than 0° C., more preferably less than −5° C., less than −10° C., less than −15° C., less than −20° C., less than −25° C., less than −30° C., less than −35° C., less than −40° C., and most preferably, less than −45° C.

Total free glycerin in the Renewable Diesel is preferably less than 0.03% by weight, more preferably less than 0.20% by weight, less than 0.018% by weight, less than 0.016% by weight, and most preferably, less than 0.015% by weight. Total glycerin present in the Renewable Diesel fuel is preferably less than 0.25% by weight, more preferably less than 0.24% by weight, less than 0.23% by weight, less than 0.22% by weight, 0.21% by weight, and most preferably, less than 0.20% by weight.

Residual methanol in the Renewable Diesel is desired to be minimized, and is preferably less than 0.2% by weight, more preferably less than 0.18% by weight, and most preferably less than 0.15% by weight.

Water content in the Renewable Diesel fuel produced according the present invention is preferably less than 500 ppm, preferably less than 450 ppm, more preferably less than 400 ppm and most preferably less than 300 ppm.

It can be important to define a minimum viscosity of the Renewable Diesel fuel because of power loss due to injection pump and injector leakage. Preferably, the viscosity of the Renewable Diesel fuel is between 1.0 and 50 $mm^2/s$, more preferably between 1.3 and 15.0 $mm^2/s$, even more preferably between 1.3 and 2.1 $mm^2/s$.

In one embodiment, the Renewable Diesel is produced on an industrial scale. For example, in a preferred embodiment, production occurs from 500 kg or more of feedstock per day. Alternatively, production may occur on batches of 1,000 kg, 5,000 kg, 10,000 kg or more feedstock per day. Global biodiesel production is estimated at several million tons per year.

Alcohols

A variety of alcohols may be suitable for use in the present esterification reaction, including any $C_{1-6}$ straight, branched, or cyclic alcohols. Preferably, the alcohol is selected from methanol, t-butanol or isobutanol, or a mixture thereof. The alcohols employed are preferably anhydrous, however the presence of water may be acceptable in some embodiments of the present reaction.

Pyrolysis Catalyst

While the pyrolysis reaction can be accomplished with heat alone, it is advantageous to utilize a solid catalyst in order to improve conversion rates and selectivity to more desirable products such as alkanes and alkenes. Numerous suitable catalysts are known to those skilled in the art. Examples include those disclosed by U.S. Pat. No. 4,554,497 as well as those disclosed by Snare (Snare, M. et al, "Heterogeneous Catalytic Deoxygenation of Stearic Acid for Production of Biodiesel", *Ind. Eng. Chem. Res.* 2006, 45, 5708-5715), and Idem (Idem, R. O. et al, "Catalytic conversion of canola oil to fuels and chemicals: roles of catalyst acidity, basicity and shape selectivity on product distribution", *Fuel Processing Technology* 51 (1997), 101-125).

Esterification Catalyst

The esterification reaction of the present invention preferably employs a solid heterogeneous catalyst having acidic functional groups on the surface thereof By heterogeneous is meant that the catalyst is a solid, whereas the reactants are in gaseous and liquid state, respectively.

The solid esterification catalyst may be a granular ion exchange resin containing —$SO_3H$ and/or —COOH groups. Macroreticular resins of this type are preferred. Examples of suitable resins are those sold under the trade marks "Amberlyst", "Dowex", "Dow" and "Purolite" such as AMBERLYST 13, AMBERLYST 66, DOW C351, and PUROLITE C150.

The catalyst used on each tray or similar vapor liquid equilibrium affecting device can be a single solid esterification catalyst selected from particulate ion exchange resins having acidic groups. A synthetic zeolite or other type of mixed or singular oxide ceramic material with sufficient acidity could also be employed. Furthermore, different trays or stages could contain different catalyst. In other cases, even when a monocarboxylic acid ester is the desired product, the alcohol component and the carboxylic acid component can be reacted to equilibrium in the presence of an acidic ion exchange resin prior to introduction of the resulting equilibrium mixture to the column reactor.

Solid particulate catalyst may also be employed. In this case, the charge of solid particulate or granular esterification catalyst on each tray is typically sufficient to provide a catalyst:liquid ratio on that tray corresponding to a resin concentration of at least 0.2% w/v, for example a resin concentration in the range of from about 2% w/v to about 20% w/v, preferably 5% w/v to 10% w/v, calculated as dry resin. Sufficient catalyst should be used to enable equilibrium or near equilibrium conditions to be established on the tray within the selected residence time at the relevant operating conditions. Additionally, the amount of catalyst on each tray should be maintained such that agitation by the upflowing vapor is sufficient to prevent "dead spots." For a typical resin catalyst a resin concentration in the range of from about 2% v/v to about 20% v/v, preferably 5% v/v to 10% v/v may be used.

Pyrolysis Reaction Vessel

According to the present invention, the pyrolysis reaction can be accomplished using a variety of reaction vessels. Examples include furnace tubes, heat exchanger tubes, fixed bed reactors, autoclaves, and batch distillation kettles. The vessel may or may not be equipped to contain a solid pyrolysis catalyst. Furthermore, the vessel may or may not be equipped to provide steam or water to the reacting mixture.

The reaction vessel itself may be equipped with means of separating out any gaseous or otherwise non-desirable lower hydrocarbons. An example of such a vessel is a batch distillation unit. Otherwise or in addition to the vessel itself, the reaction vessel can feed a distillation unit that separates lower hydrocarbons from the pyrolysis product.

Esterification Reaction Vessel

The present invention may be practiced in a variety of reaction vessels, preferably in distillation columns having a variety of catalyst arrangements. Preferably, the vessel includes a reaction zone providing means for sufficiently contacting the reactants in the presence of a catalyst. Such means may include a plurality of trays, or structured packing that operates similar to the trays in a column. A suitable distillation column for reactive distillation according to the present invention is described in U.S. Pat. No. 5,536,856 (Harrison, et al.) which is incorporated herein by reference. A different design for the equilibrium stages is described in U.S. Pat. No. 5,831,120 (Watson, et al.), and Sulzer sales brochure ""Katapak: Catalysts and Catalyst Supports with Open Crossflow Structure"; Sulzer Chemtech; (undated)" each of which is incorporated herein by reference.

Exemplary structured packing preferably includes porous catalyst supports and flow channels for the stripping gas between the catalyst supports. In the flow channels, the downward directed flow of the liquid and the upwardly directed stripping gas contact each other, in the presence of the acidic solid catalyst, such that the esterification reaction takes place.

The catalyst may be microporous (pore diameters less than 2 nm), mesoporous (pore diameters between 2 nm and 50 nm), or macroporous (pore diameters greater than 50 nm). Additionally, the catalyst selected must have sufficient stability (i.e., minimal loss of activity) at the operating temperatures necessary, depending upon the alcohol component of the reaction. For example, if methanol, ethanol, n-propanol, isopropanol, n-butanol, tert-butanol or isobutanol is selected as the alcohol, then the catalyst (for example, an ion exchange resin), must be able to be used at temperatures between 120° C. and 140° C.; and must only moderately lose activity in this temperature range. If however, 2-ethyl-hexanol is selected as the alcohol component, then the catalyst should be usable at higher temperatures, such as for example, approximately 150° to 230° C.

In certain embodiments, the catalyst can be a fixed-bed catalyst. In a fixed bed arrangement, the reaction vessel can be operated as a trickle column of which about 30 to 60 vol %, preferably 50 vol % are utilized by the stripping gas as free gas space, whereas 30 to 50 vol %, preferably 40 vol % of the column is occupied by solid substance, i.e. the fixed-bed catalyst. The remaining reaction space, preferably 10 vol % or less, is occupied by the trickling liquid. When using a fixed bed, the residence time of the liquid phase can be adjusted by the stripping gas velocity. The residence time of the liquid phase is high with higher velocities of the stripping gas volume. Generally, the stripping gas throughput can be adjusted in a wide range without having an adverse effect on the progress of the reaction.

Pyrolysis Reaction Conditions

A range of suitable conditions for the pyrolysis reaction is known to those skilled in the art. Suitable conditions in the presence and absence of catalyst and/or steam are described, for example, by Snare (Snare, M. et al, "Heterogeneous Catalytic Deoxygenation of Stearic Acid for Production of Biodiesel", *Ind. Eng. Chem, Res.* 2006, 45, 5708-5715), Idem (Idem, R. O. et al, "Catalytic conversion of canola oil to fuels and chemicals: roles of catalyst acidity, basicity and shape selectivity on product distribution", *Fuel Processing Technology* 51 (1997), 101-125), and Schwab (Schwab, A. W. et al, "Preparation and properties of diesel fuels from vegetable oils", *Fuel,* 66, 1987, 1372-1378).

Esterification Reaction Conditions

The esterification conditions used in a distillation reactor according to the present invention will normally include the use of elevated temperatures up to about 160° C. Typically, the reaction conditions are determined based upon the boiling point of the less volatile component, typically the alcohol component. Generally, the esterification reaction may be conducted at a temperature in the range of from about 80° C. to about 140° C., preferably in the range of from about 100° C. to about 125° C. The particular operating temperature of the reaction is also determined based on the thermal stability of the esterification catalyst, the kinetics of the reaction and the vapor temperature of the less volatile component at the relevant inlet pressure. Typical operating pressures at the inlet of the column reactor may range from about 0.1 bar to about 25 bar. Additionally, the liquid hourly space velocity through the column reactor may range of from about 0.1 $hr^{-1}$ to about 10 $hr^{-1}$, typically from about 0.2 $hr^{-1}$ to about 2 $hr^{-1}$, may be used.

Referring now to FIG. 1, there is provided an embodiment of a process for the preparation of Renewable Diesel from animal and vegetable oils. Feed Stream 1 contains liquids derived from animal and vegetable sources. Such liquids may contain fatty acids, glycerides of fatty acids, esters, alcohols, and other hydrocarbons. Feed stream 1 could also contain petroleum derived hydrocarbons. Feed stream 1 is fed to a pyrolysis reactor 2.

Pyrolysis reactor 2 may or may not be equipped to contain a solid pyrolysis catalyst whose purpose is to improve conversion and selectivity to alkanes and alkenes. Pyrolysis reactor 2, and any coupled separation device such as a distillation column, is operated in order to, at a minimum, convert any remaining glycerides to free fatty acids. In a preferred embodiment, pyrolysis reactor 2 is operated under conditions that leave little, if any, fatty acids in the liquid product 4. Pyrolysis reactor 2 and any distillation device therewith incorporated will also produce a product 3 consisting of lower boiling hydrocarbons, CO, $CO_2$, hydrogen, and water and liquid product 4. Liquid product 4 of Pyrolysis reactor 2 may or may not meet all specifications of ASTM D396 and/or D975 at this point but Liquid product 4 may meet the distillation and flash point ranges are near as possible. When Pyrolysis reactor 2 is operated to result in conversion of fatty acids to alkanes, alkenes, and other oxygenates, liquid product 4 may or may not be distinguished by being acidic.

In the event that liquid product 4 of Pyrolysis reactor 2 is too acidic to meet the corrosion specifications of more valuable products included under ASTM D396 and/or D975, it is fed to Reactive Distillation Esterification Unit 6. Reactive Distillation Esterification Unit 6 is also fed with an alcohol stream 5. Within the Reactive Distillation Esterification Unit 6, acidic components in the liquid product 4 are reacted with the alcohol from stream 5 and converted to esters product 7. Water of reaction and alcohol are also separated so that excess alcohol used in the reaction can be recycled.

Figure 2:
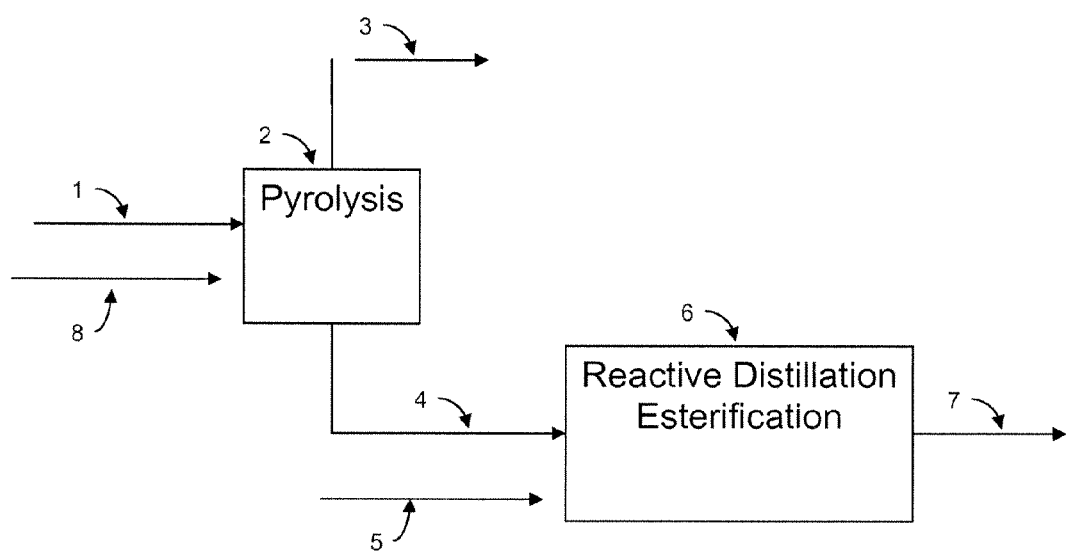
FIG. 2 shows another embodiment of the present reaction for the preparation of low acidity Renewable Diesel by steam-assisted pyrolysis followed by reactive distillation esterification.

Referring to FIG. 2, the same process is contemplated with the difference being the feeding of stream 8 along with the feedstock in stream 1. Stream 8 contains water or steam. Feeding steam or water as stream 8 along with feed stream 1 is intended to help minimize the formation of coke. In one embodiment, FIG. 2 corresponds in all other regards to FIG. 1.

It will be understood by those skilled in the art that the drawings are diagrammatic and that further items of equipment such as reflux drums, pumps, vacuum pumps, temperature sensors, pressure sensors, pressure relief valves, control valves, flow controllers, level controllers, holding tanks, storage tanks, and the like may be required in a commercial plant. The provision of such ancillary items of equipment forms no part of the present invention and is in accordance with conventional chemical engineering practice.

Modifications and variations of the present invention relating to the selection of reactors, feedstocks, alcohols and catalysts will be obvious to those skilled in the art from the foregoing detailed description of the invention. Such modifications and variations are intended to come within the scope of the appended claims. All numerical values are understood to be prefaced by the term "about" where appropriate. All references cited herein are hereby incorporated by reference in their entirety.

The invention claimed is:

1. An industrial process for preparing Renewable Diesel from a feedstock of vegetable and/or animal origin comprising:
    subjecting the feedstock to catalyzed pyrolysis to produce a pyrolyzed composition comprising carboxylic acid;
    esterifying said carboxylic acid with alcohol in a countercurrent reactive distillation column to yield a fuel according to either ASTM D396 or ASTM D975, wherein the fuel comprises less than 5 ppm sulfur, less than 0.20% by weight total free glycerin, less than 0.15% by weight residual methanol, and less than 300 ppm water.

2. The process of claim 1, wherein said pyrolysis is carried out in a direct fired furnace or a heat exchanger.

3. The process of claim 1, wherein said pyrolysis and said esterifying are carried out in a direct fired or indirect heated batch distillation column.

4. The process of claim 1, claim 2 or claim 3, wherein said pyrolysis is carried out in the presence of steam.

5. The process of claim 1, wherein said esterification is carried out using a solid catalyst.

6. The process of claim 5, wherein the solid catalyst is an ion exchange resin catalyst comprising —SO3H or —CO2H functional groups.

7. The process of claim 1, wherein the alcohol is selected from methanol, t-butanol, isobutanol, or a mixture thereof.

* * * * *